United States Patent [19]

Daisho et al.

[11] Patent Number: 5,291,929

[45] Date of Patent: Mar. 8, 1994

[54] PNEUMATIC TIRE

[75] Inventors: Yasujiro Daisho; Susumu Watanabe, both of Hiratsuka; Izumi Kuramochi, Tokyo, all of Japan

[73] Assignee: The Yokohama Rubber Co., Ltd., Tokyo, Japan

[21] Appl. No.: 963,212

[22] Filed: Oct. 19, 1992

[30] Foreign Application Priority Data

Nov. 6, 1991 [JP] Japan .................. 3-289850

[51] Int. Cl.$^5$ .............................. B60C 11/08
[52] U.S. Cl. .............................. 152/209 R
[58] Field of Search .......... 152/209 R, 209 A, 209 D; D12/146-148

[56] References Cited

U.S. PATENT DOCUMENTS

| | | | |
|---|---|---|---|
| D. 311,892 | 11/1990 | Croley et al. | D12/147 |
| D. 316,690 | 5/1991 | Tagashira | D12/146 |
| 4,962,801 | 10/1990 | Tsuda | 152/209 R |
| 5,105,864 | 4/1992 | Watanabe et al. | 152/209 R |
| 5,178,697 | 1/1993 | Watanabe et al. | 152/209 R |

FOREIGN PATENT DOCUMENTS

| | | | |
|---|---|---|---|
| 3074208 | 3/1991 | Japan | 152/209 R |
| 4-043105 | 2/1992 | Japan | 152/209 R |
| 4-126612 | 4/1992 | Japan | 152/209 R |

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic tire having a plurality of main grooves extending in the circumferential direction of a tread surface, and a plurality of auxiliary grooves each of which is disposed in the shape of the letter "V" and extended in one of the circumferential directions of the tread surface, the apexes of the V-shaped auxiliary grooves being distributed in left and right regions each extending from the equator of the tire as much as 5-25% of the width of a ground contacting portion of the tread surface, in such a manner that the numbers of the apexes in the left and right regions become substantially equal to each other, characterized in that quasi-main grooves each of which connects at least two circumferentially arranged auxiliary grooves together are provided in left and right regions each extending from the equator of the tire as much as 25-50% of the width of a ground contacting portion of the tread surface, in such a manner that the quasi-main grooves are inclined at an angle of 5°-25° with respect to the equator of the tire.

4 Claims, 6 Drawing Sheets

PNEUMATIC TIRE

BACKGROUND OF THE INVENTION

This invention relates to a pneumatic tire displaying improved drainage characteristics when the vehicle travels on a wet road surface.

In general, when a vehicle runs on a wet road surface, a coefficient of friction between a tire and the road surface decreases. Especially, when the depth of the water on a wet road surface is large, or, when the vehicle runs on a wet road surface at a high speed, a water layer is formed between a tire surface and the road surface, so that the coefficient of friction decreases greatly. This condition is called hydroplaning. When hydroplaning occurs, the steering of the vehicle becomes impossible, and an accident is liable to occur. In order to prevent the occurrence of this hydroplaning, it is necessary to improve the drainage characteristics of a tire.

In order to improve the drainage characteristics, a pneumatic tire which has heretofore been employed is provided in a tread surface thereof with V-shaped auxiliary grooves extending in the same manner in one circumferential direction of the tread surface with the opposed parts of these grooves arranged in substantially parallel with each other in addition to a main groove extending in the circumferential direction of the tread surface, the apexes of these V-shaped auxiliary grooves being positioned substantially on the center (equator) of the width of the tire. However, in a tire having such a so-called directional tread pattern, the drainage characteristics lower when the vehicle turns to cause the ground contacting center of the tread surface to be displaced toward a shoulder as a load moves toward the shoulder.

Japanese patent application Kokai publication No. 02-175304 proposes a pneumatic tire having a special tread pattern, i.e., provided with a plurality of main grooves, and V-shaped auxiliary grooves the apexes of which are distributed in regions extending from the equator of the tire to left and right to a width accounting for 5-25% of the width of a ground contacting portion of a tread surface, in such a manner that the numbers of the apexes on these left and right regions become substantially equal to each other. This tire enables the drainage efficiency during the turning of the vehicle to be improved as compared with a tire in which the apexes of V-shaped auxiliary grooves arranged on the equator.

Although the drainage efficiency of the pneumatic tire of Japanese patent application Kokai publication No. 02-175304 during the turning of a vehicle is superior, the drainage efficiency thereof during a straight travel of a vehicle still remains at the level of that of a conventional pneumatic tire in which the apexes of the V-shaped auxiliary grooves are positioned on the center of the width of the tire, and is not always satisfactorily high.

SUMMARY OF THE INVENTION

An object of the present invention is to provide a pneumatic tire capable of displaying an improved drainage efficiency when a vehicle advances straight and turns on a wet road surface.

The pneumatic tire according to the present invention developed so as to achieve this object has a plurality of main grooves extending in the circumferential direction of a tread surface, and a plurality of auxiliary grooves each of which is disposed in the shape of the letter "V" and extended in one of the lateral directions of tread surface, the apexes of which V-shaped auxiliary grooves are distributed in left and right regions each first region being spaced from the equator of the tire from 5-25% of the width of a ground contacting portion of the tread surface, in such a manner that the numbers of apexes in these left first regions become substantially equal to each other, characterized in that quasi-main grooves each of which connects at least three circumferentially arranged auxiliary grooves together are arranged in left and right second regions, each second region being space from the equator of the tire from 25 to 50% of the width of a ground contacting portion of the tread surface, in such a manner that the quasi-main grooves are inclined at an angle of 5°-25° with respect to the equator of the tire.

Owing to the quasi-main grooves thus provided in addition to the main grooves in the left and right second regions each being space from the equator of the tire from 25 to 50% or the width of a ground contacting portion of the tread surface, in such a manner that the quasi-main grooves are inclined at an angle of 5°-25° with respect to the equator of the tire, the drainage efficiency of the tire displayed both when a vehicle travels straight on a wet road surface, and when a vehicle turns thereon can be improved.

The width of a ground contacting portion of a tread surface referred to in the present invention means a maximum width of the ground contacting portion of a tread surface measured when a standard load is imparted to a pneumatic tire filled with standard air stipulated in JATMA or ETRTO.

DESCRIPTION OF THE PREFERRED EMBODIMENTS

Figure 1:
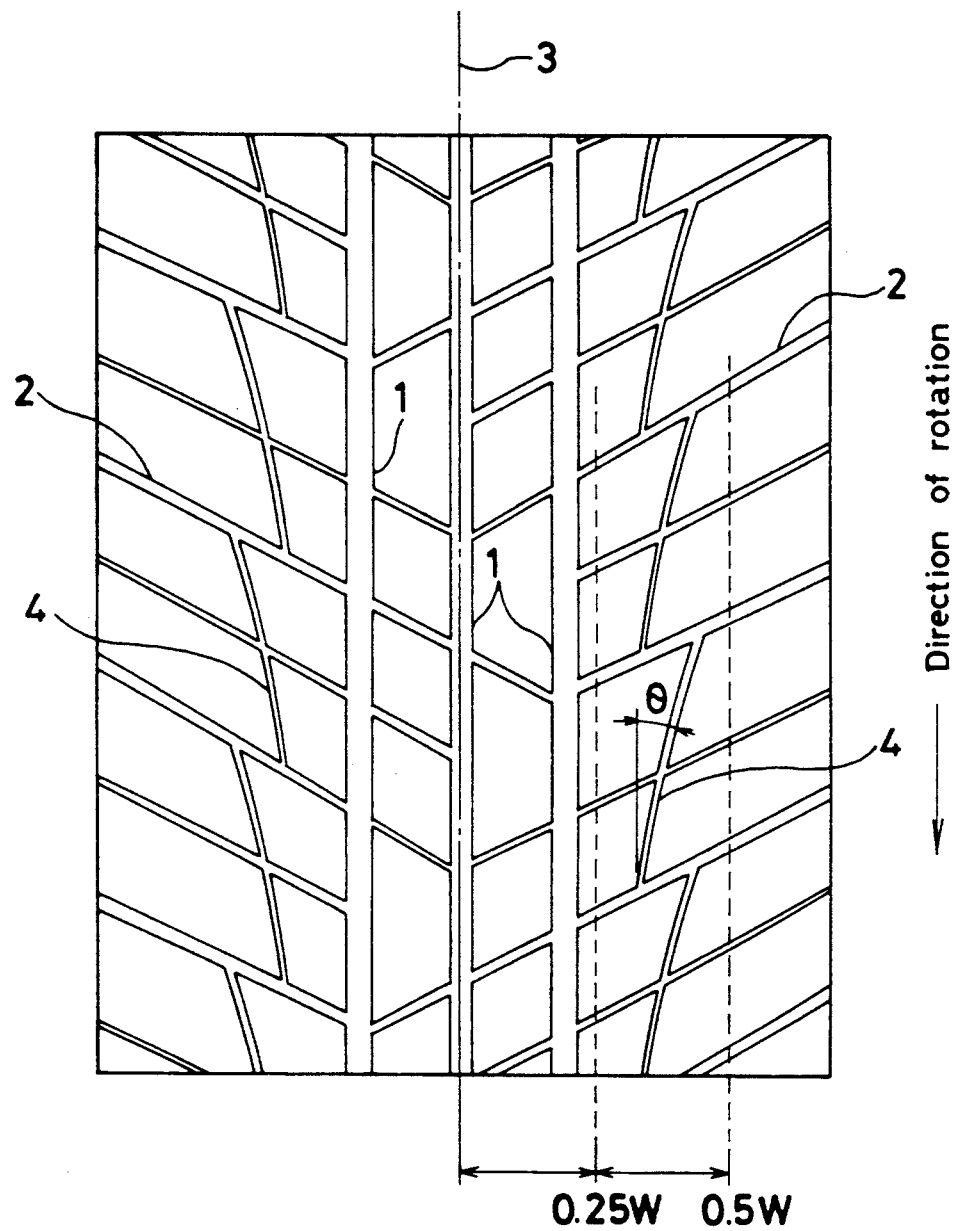
FIG. 1 is an expansion plan showing a pattern of a tread surface of a pneumatic tire according to the present invention.

Referring to FIG. 1, a tread surface of a tire is provided with a plurality of circumferentially extending main grooves 1, and a plurality of auxiliary grooves 2 each of which is disposed in the shape of the letter "V" and extended in one of the lateral directions of the tire. These V-shaped auxiliary grooves are arranged so that the apexes thereof are distributed in left and right first regions each first region being spaced from the equator 3 of the tire from 5 to 25% of the width of a ground contacting portion of the tread surface, in such a manner that the numbers of apexes of these left and right first regions become substantially equal to each other.

The widths of the first regions in which the apexes of the V-shaped auxiliary grooves 2 are arranged are set to a level which is 5-25% of that of the width of a ground contacting portion of a tread surface in this embodiment, taking into consideration the drainage efficiency of the tire to be displayed when the vehicle runs, straight and turns. When the width of these being spaced from the equator 3 of the tire to left and right is set less than 5% of that of the ground contacting portion of the tread surface, the apexes of the auxiliary grooves 2 are positioned close to the equator 3, so that the drainage efficiency during the turning of the vehicle lowers. When the width of these regions is set more than 25% of that of the ground contacting portion of the tread surface, the apexes of the auxiliary grooves 2 are positioned in the lateral end portions of the tread surface, so that the drainage efficiency during a straight travel of the vehicle lowers.

Figure 2A:
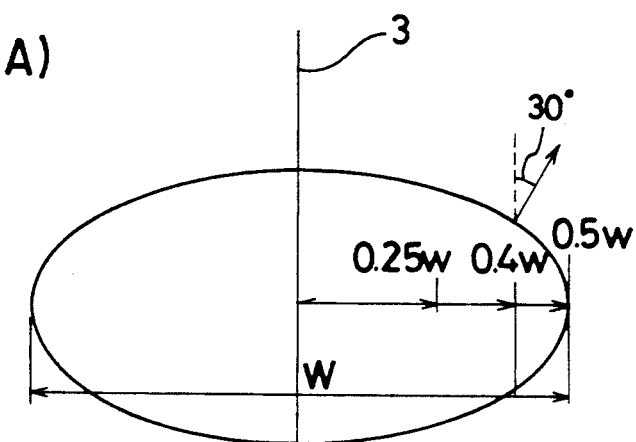
FIG. 2 is a schematic diagram showing the shape A of a ground contacting portion of the pneumatic tire of FIG. 1 during a straight travel of a vehicle, and the shape B of a ground contacting portion thereof during a travel of a vehicle at a turning limit speed.
Figure 2B:
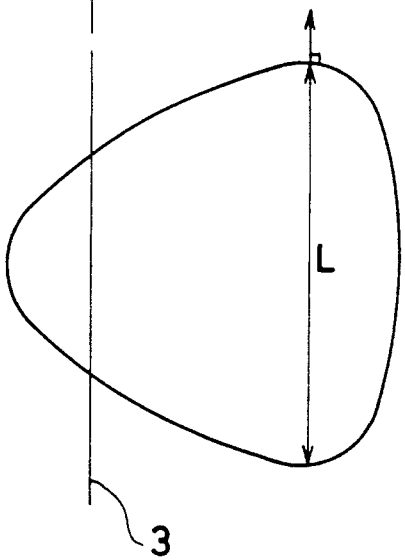

An observation study of the direction in which the water removed by the ground contacting front end of a tread surface of a tire attached to a vehicle and running on a wet road surface is drained makes it clear that the water is drained in the normal direction of the ground contacting front end line on the tread surface. As shown in FIG. 2, a maximum length L of a ground contacting portion of the tread surface of a tire rotating at a turning limit speed is measured in left and right regions each being spaced from the equator 3 of the tire as much as 35-45% of the width W of the ground contacting portion of the tread surface. The normal line of the front end line of the ground contacting portion, which has a maximum length L during a travel of the vehicle at a turning limit speed, of the tread surface has an angle of about 0° with respect to the equator 3 of the tire, and the normal line in the same position in the widthwise direction of the tire of the front end line of the ground contacting portion of the tread surface during a straight travel of the vehicle is inclined at an angle of about 30° with respect to the equator 3 of the tire.

Therefore, according to the present invention, quasi-main grooves each of which connects at least two circumferentially arranged auxiliary grooves together are provided in addition to the main and auxiliary grooves 1, 2 in second regions each being spaced from 25 to 50% of the width of a ground contacting portion of the tread surface during a straight travel of the vehicle, in such a manner that the quasi-main grooves 4 have an angle of inclination $\theta$ of 5-25° with respect to the equator 3 of the tire. The directions in which these quasi-main grooves 4 extend agrees with those in which the water is drained both when the vehicle runs straight and when the vehicle turns, so that the drainage efficiency during a straight travel and the turning of a vehicle is improved.

Taking the widthwise extension of the quasi-main grooves 4 due to the inclination thereof into consideration, these grooves 4 are formed in left and right second regions each being space from the equator 3 of the tire from 25 to 50% of the width W of a ground contacting portion of the tread surface, preferably around a portion at a distance from the equator 3 of the tire about 40% of the width W. The angle of inclination $\theta$ of the quasi-main grooves 4 with respect to the equator 3 is set to 5°-25° for the following reasons. When angle of inclination $\theta$ is less than 5°, the drainage efficiency during a straight travel of the vehicle lowers, and, when it exceeds 25°, the drainage efficiency during the turning of the vehicle lowers.

Figure 3:
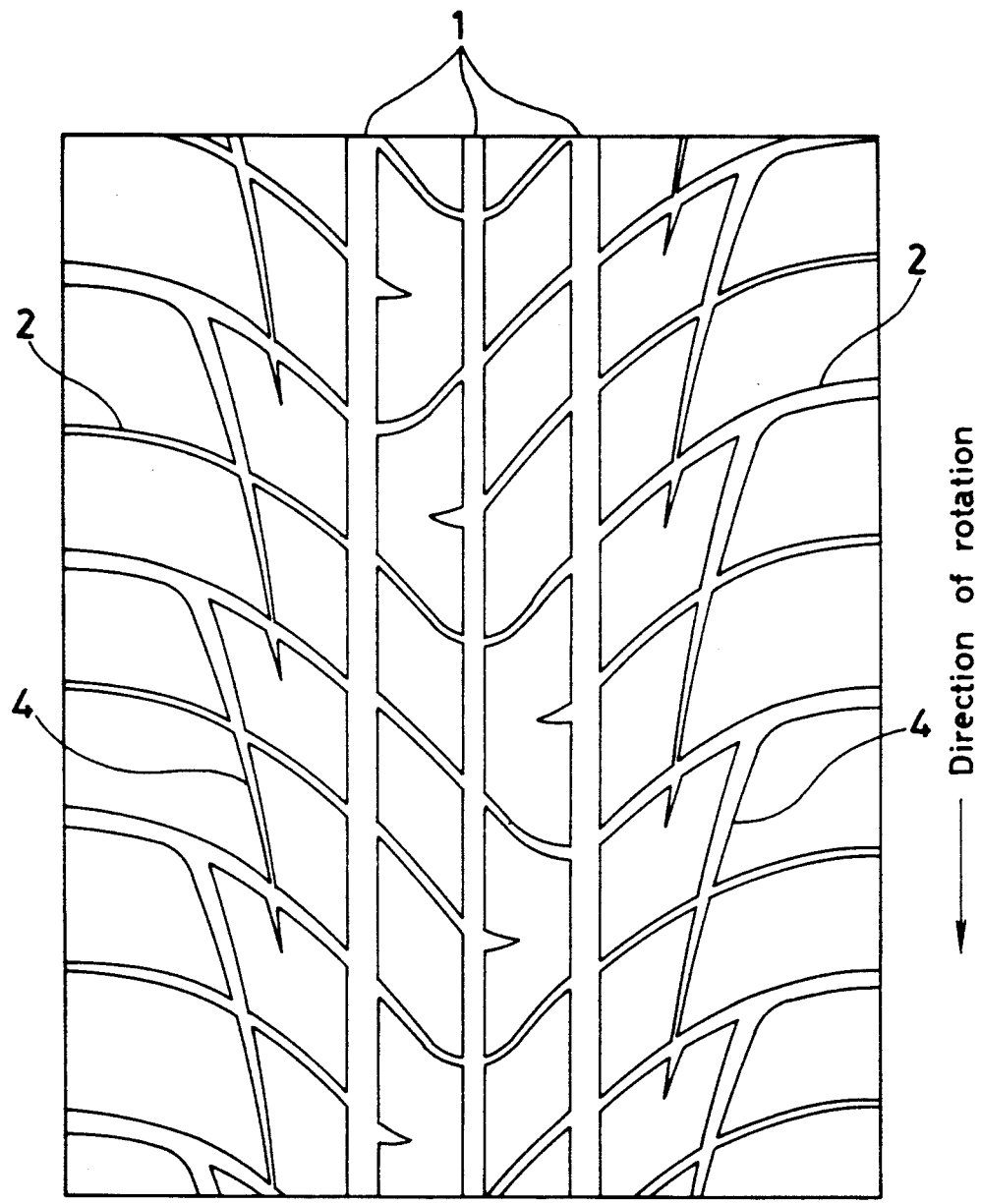
FIG. 3 is an expansion plan showing a modified example of the pattern of a tread surface of a pneumatic tire according to the present invention.
Figure 4:
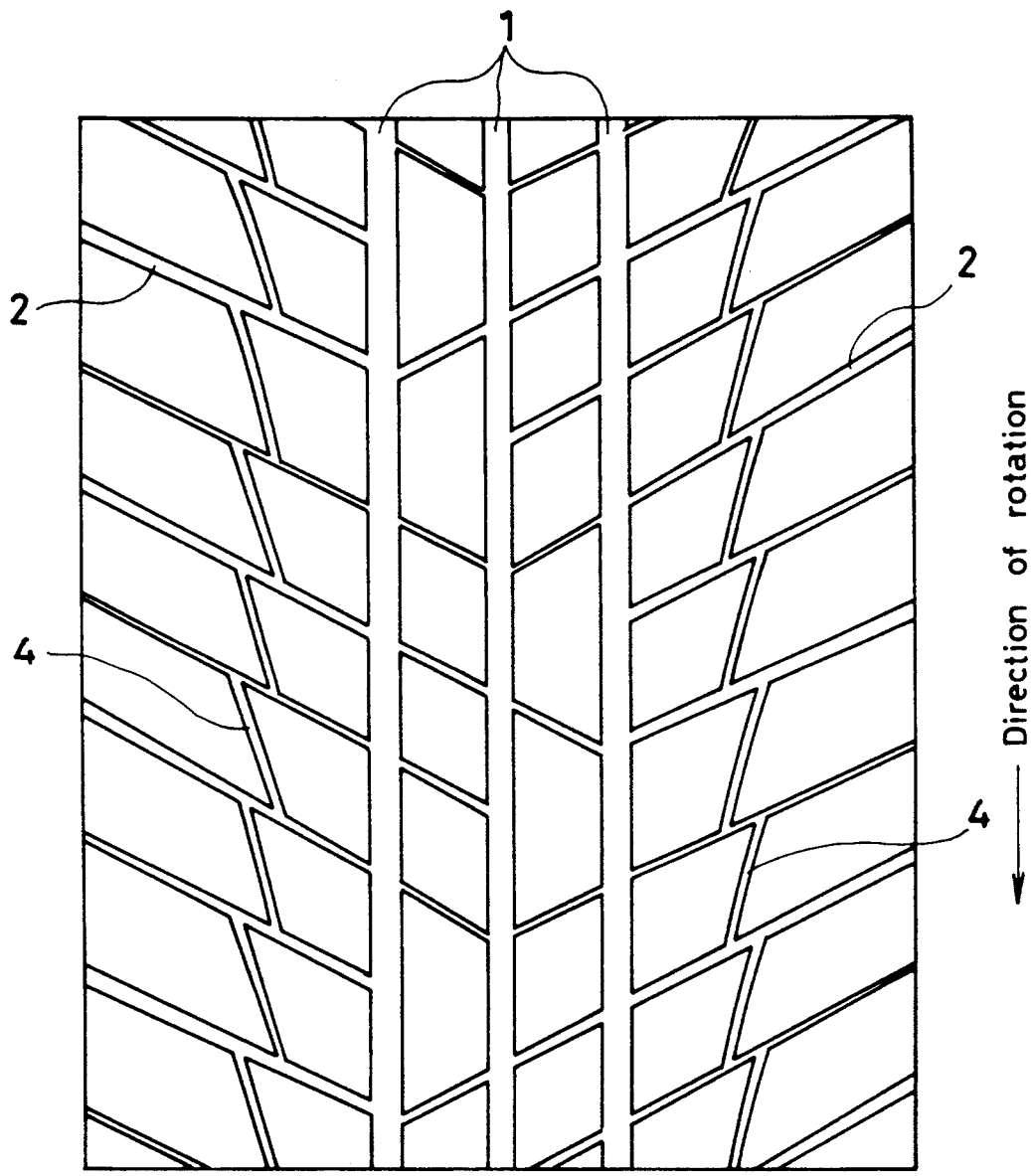
FIG. 4 is an expansion plan showing another modified example of the pattern of a tread surface of a pneuamtic tire according to the present invention.
Figure 5:
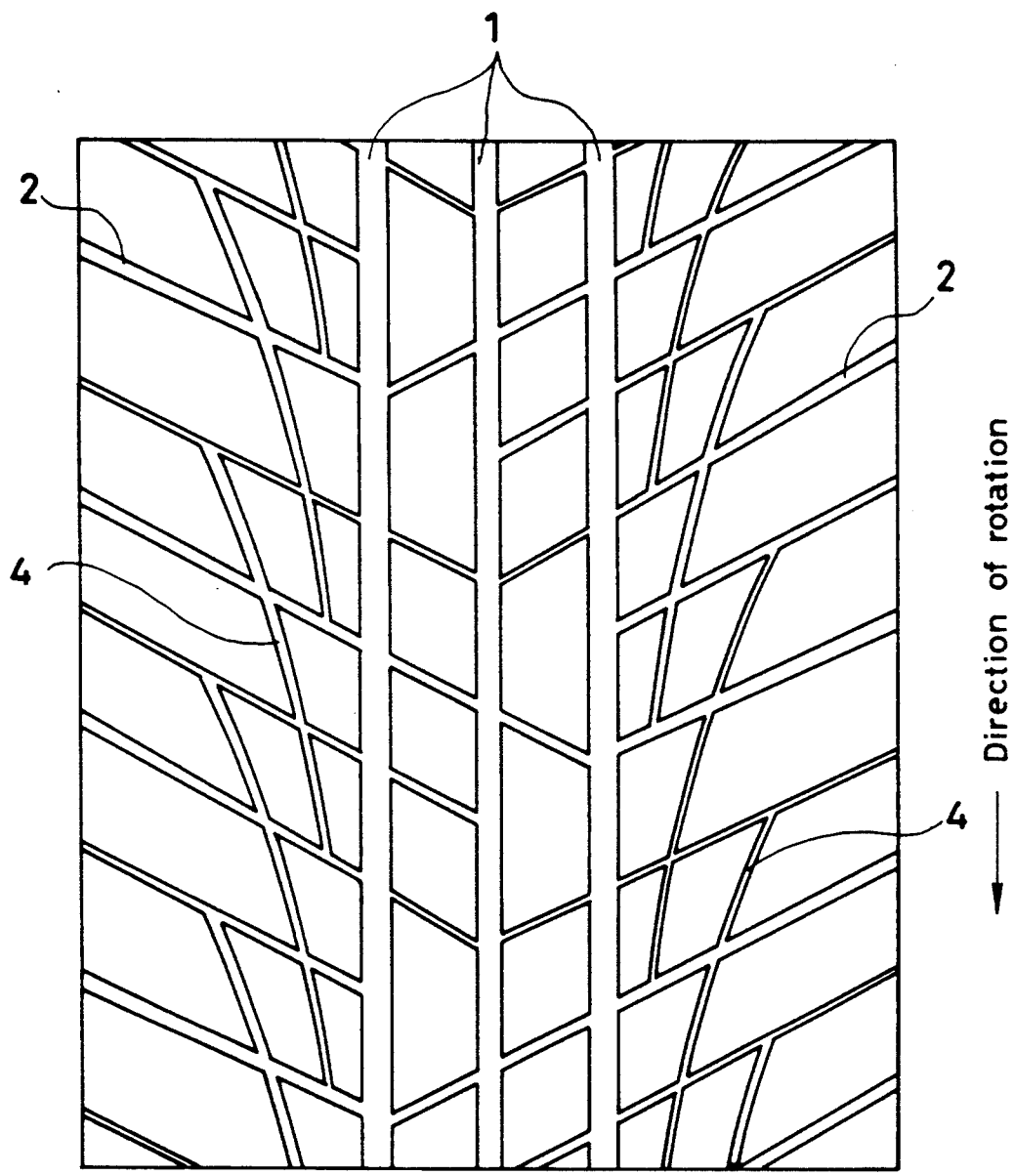
FIG. 5 is an expansion plan showing still another modified example of the pattern of a tread surface of a pneumatic tire according to the present invention.

According to the present invention, the widths of the main grooves 1, auxiliary grooves 2 and quasi-main grooves 4 are not limited in particular, and these grooves can be curved suitably as shown in FIG. 3. When the quasi-main grooves 4 are cured, the angle of inclination $\theta$ thereof can be regarded to be equivalent to an angle made by a line connecting the centers of both ends of each groove. Some other modified examples can be shown, which include an example in which two circumferentially arranged auxiliary grooves 2 only are connected by a quasi-main groove 4 as shown in FIG. 4, and an example in which four circumferentially arranged auxiliary grooves 2 are connected by a quasi-main groove 4, and in which adjacent quasi-main grooves 4 are partially overlapped in the widthwise direction of the tire as shown in FIG. 5.

According to the present invention described above, a pneumatic tire is formed by providing in a tread surface thereof with a plurality of main grooves extending in the circumferential direction thereof, a plurality of V-shaped auxiliary grooves arranged so that the apexes thereof are distributed in left and first right regions each being spaced from the equator of the tire from 5 to 25% of the width of a ground contacting portion of the tread surface, in such a manner that the numbers of apexes in these left and right first regions become substantially equal to each other, and quasi-main grooves, which connect the auxiliary grooves together, arranged in left and right second regions each being spaced from the equator of the tire from 25 to 50% of the width of a ground contacting portion of the tread surface, in such a manner that an angle of inclination of the quasi-main grooves with respect to the equator of the tire is 5°-25°. Therefore, the drainage efficiency of this tire during both a straight travel and the turning of the vehicle on a wet road surface is very high. This can prevent the occurrence of hydroplaning both when the vehicle runs straight and when the vehicle turns.

EXAMPLE

A tire according to the present invention and a conventional tire were produced under the conditions set differently in various points as follows except that the size of these tires and the area ratio of the grooves in the tread surface were set to 255/40ZR17 and 29% respectively.

(1) Tire according to the present invention

Tread pattern: As shown in FIG. 1
Positions of second main-grooves adjacent to the central main groove: First regions spaced from the equator of the tire to left and right to a width accounting for 19% of the width of a ground contacting portion of a tread surface.
Positions of quasi-main grooves: Second regions spaced from the equator of the tire to left and right to a width accounting for 33-44% (central position: 38.5%)
Angle of quasi-main grooves: 13° with respect to the equator of the tire.

(2) Conventional tire

Figure 6:
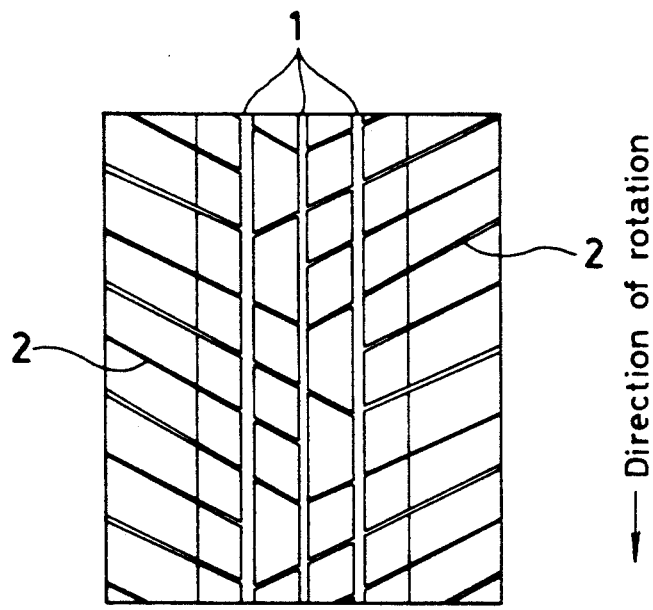
FIG. 6 is an expansion plan showing a pattern of a tread surface of a conventional pneumatic tire.

Tread pattern: As shown in FIG. 6.
Positions of second main grooves adjacent to the central main groove: First regions spaced from the equator of the tire to left and right to a width accounting for 19% of the width of a ground contacting portion of a tread surface.

Regarding the tire according to the present invention and the conventional tire, measurement was conducted on the following points.

Cornering force

The cornering force of the tires was measured with a tire to be tested attached to a test machine at a slip angle of 5° and rotated at a speed of 10 km/h. The results are shown by indexes based on 100 which represents the cornering force of the conventional tire.

Speed at which hydroplaning occurs when the vehicle travels straight

A tire to be tested was attached to a vehicle, and speed at which hydroplaning occurred when the vehicle travelled straight on a road surface of a predetermined depth of water was measured. The results are shown by indexes based on 100 which represents the rotational speed at which hydroplaning occurs of the conventional tire.

Speed at which hydroplaning occurs when the vehicle turns

A tire to be tested was attached to a vehicle, and a limit speed at which hydroplaning occurred when the vehicle was turned with a predetermined radius on a road surface of a predetermined depth of water was determined. The results are shown by indexes based on 100 which represents the limit rotational speed at which hydroplaning occurs of the conventional tire.

TABLE 1

|  | Tire according to the present invention | Conventional tire |
| --- | --- | --- |
| Cornering force (index) | 100 | 100 |
| Speed at which hydroplaning occurs when the vehicle travels straight (index) | 108 | 100 |
| Speed at which hydroplaning occurs when the vehicle turns (index) | 101 | 100 |

Table 1 clearly shows that, when the cornering force of the tire according to the present invention is equal to that of the conventional tire, the speed at which hydroplaning occurs when the vehicle travels straight, and the speed at which hydroplaning occurs when the vehicle turns are high as compared with those of the conventional tire, i.e., the drainage efficiencies attained by the tire according to the present invention both when the vehicle travels straight and when the vehicle turns are high.

What is claimed is:

1. A pneumatic tire having a plurality of main grooves extending in the circumferential direction of a tread surface, and a plurality of auxiliary grooves each of which is disposed in the shape of the letter "V" and extended in one of the lateral directions of said tread surface, the apexes of said V-shaped auxiliary grooves being distributed in left and right first regions each first region being spaced from the equator of said tire from 5 to 25% of the width of a ground contacting portion of said tread surface, in such a manner that the numbers of said apexes in said left and right first regions become substantially equal to each other, wherein quasi-main grooves, each of which connects at least three circumferentially spaced auxiliary grooves together, are provided in left and right second regions each second region being spaced from the equator of said tire from 25 to 50% of the width of a ground contacting portion of said tread surface, in such a manner that said quasi-main grooves are inclined at an angle of 5°–25° with respect to the equator of said tire.

2. A pneumatic tire according to claim 1, wherein said quasi-main grooves are formed around a portion at a distance from the equator of said tire of 40% of a width of a ground contacting portion of said tread surface.

3. A pneumatic tire according to claim 1, wherein said quasi-main grooves consist of curved grooves.

4. A pneumatic tire according to claim 1, wherein the quasi-main grooves have a defined extension in the circumferential direction of the tire and each two circumferentially adjacent quasi-main grooves connect two circumferentially adjacent auxiliary grooves without duplication.

* * * * *